Feb. 7, 1967 E. P. ANDERSON 3,303,118
CATHODIC PROTECTION AND ANTI-MARINE FOULING ELECTRODE SYSTEM
Filed April 8, 1963 3 Sheets-Sheet 1
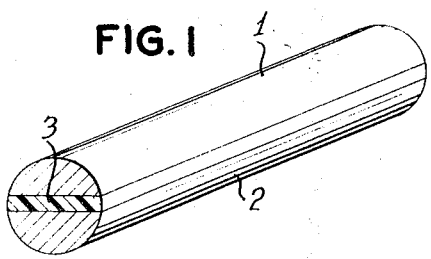
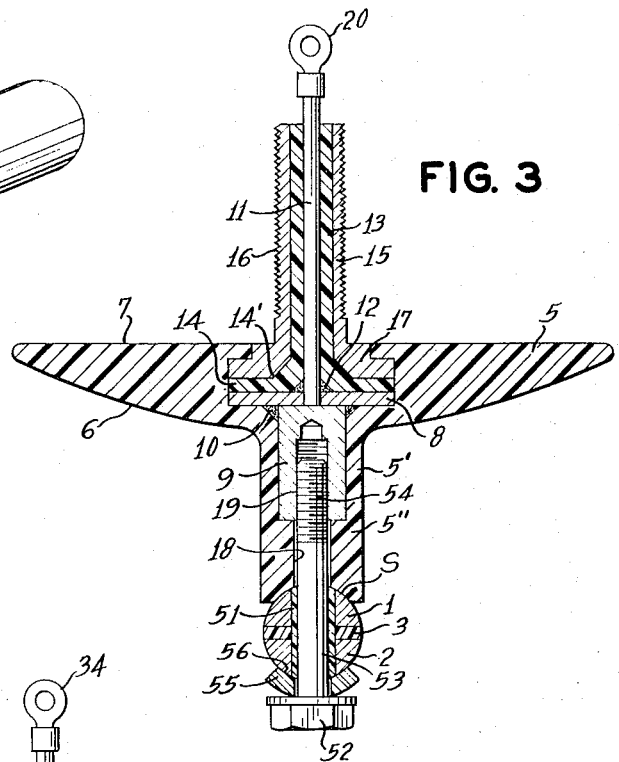
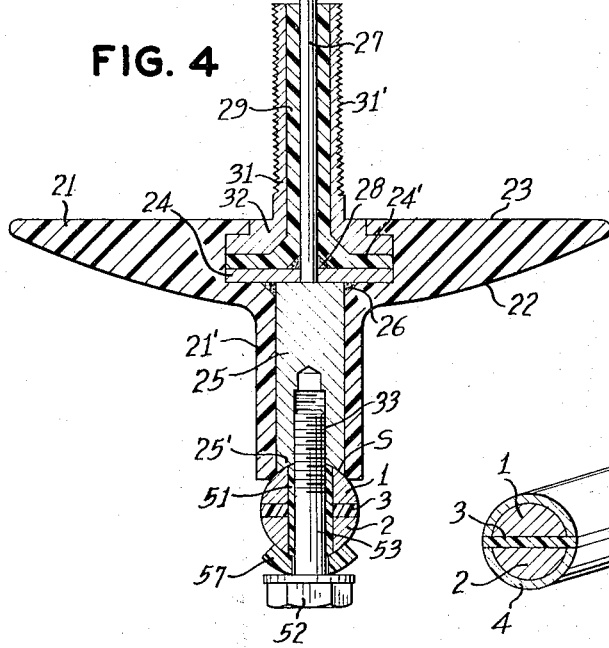
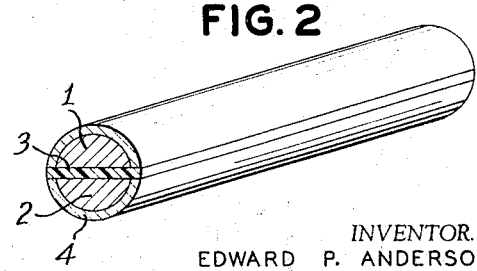
INVENTOR.
EDWARD P. ANDERSON
BY
AGENT
ATTORNEY

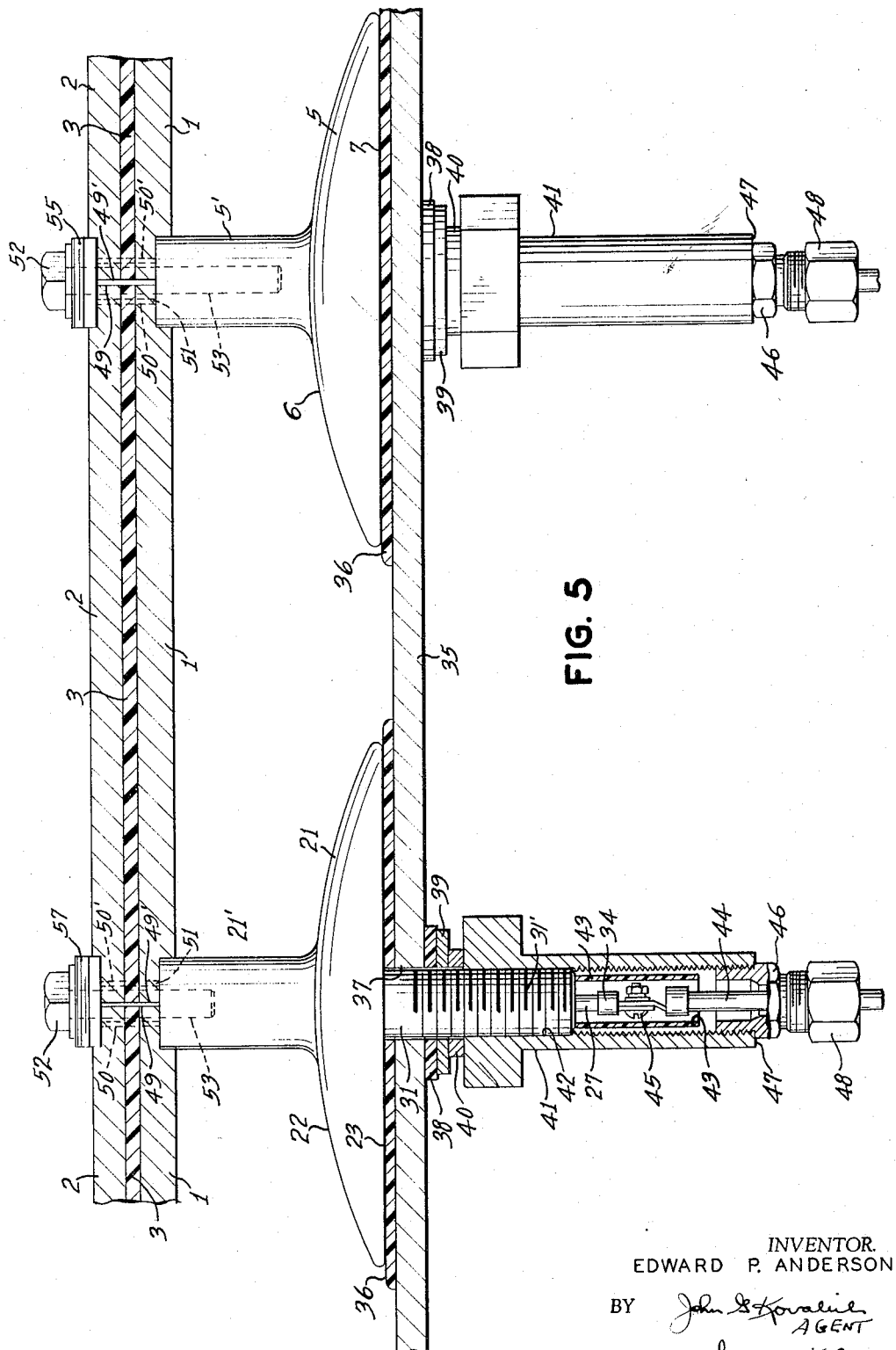

Feb. 7, 1967 E. P. ANDERSON 3,303,118
CATHODIC PROTECTION AND ANTI-MARINE FOULING ELECTRODE SYSTEM
Filed April 8, 1963 3 Sheets-Sheet 3
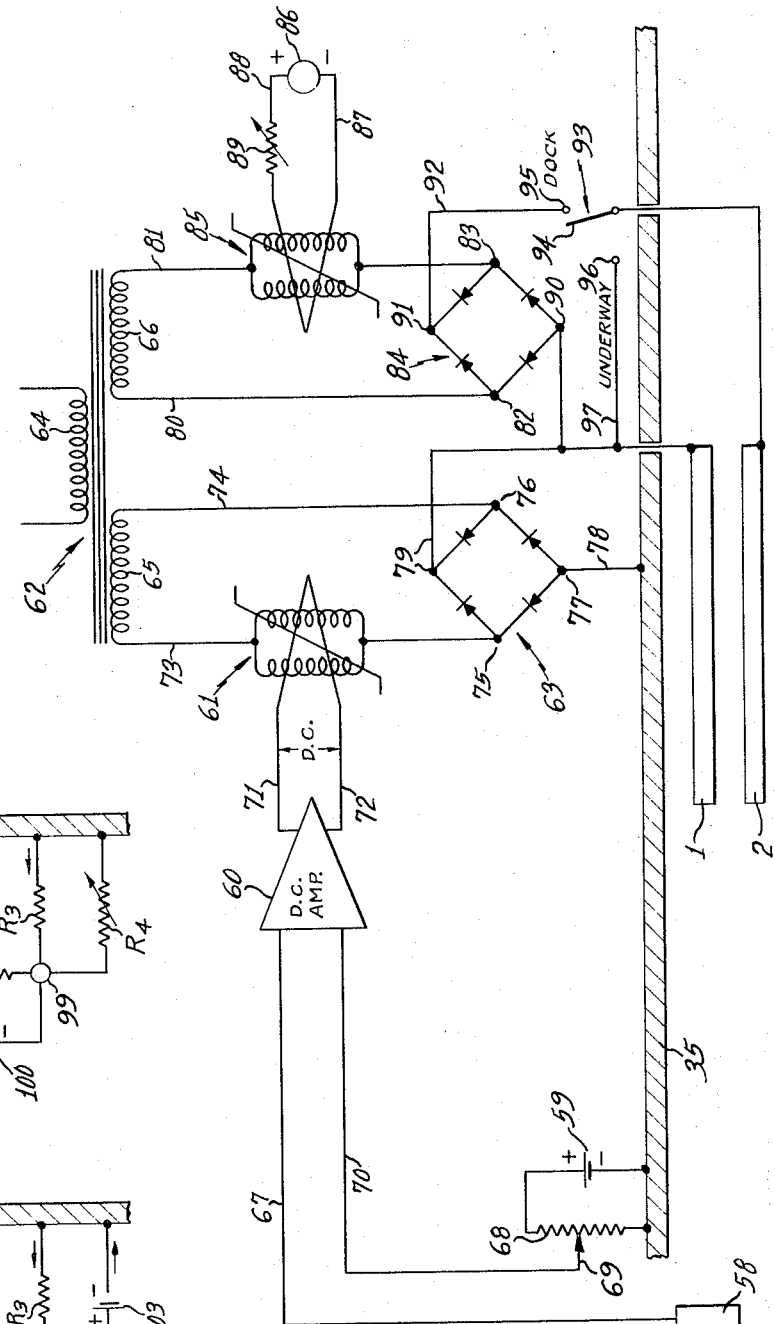
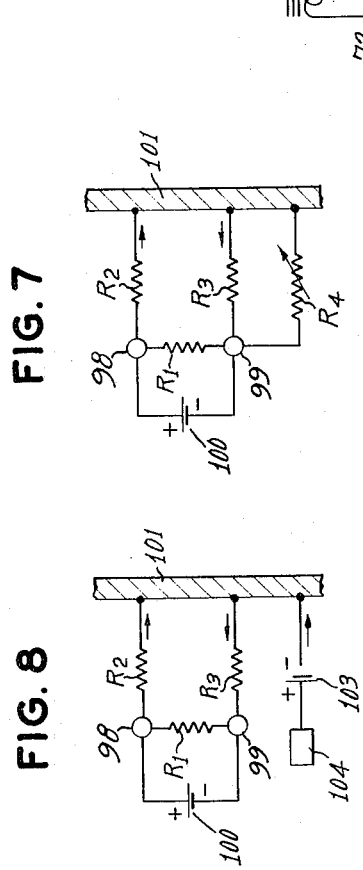
INVENTOR.
EDWARD P. ANDERSON
BY
AGENT
ATTORNEY

United States Patent Office 3,303,118
Patented Feb. 7, 1967

3,303,118
CATHODIC PROTECTION AND ANTI-MARINE
FOULING ELECTRODE SYSTEM
Edward P. Anderson, Livingston, N.J., assignor to Engelhard Industries, Inc., Newark, N.J., a corporation of Delaware
Filed Apr. 8, 1963, Ser. No. 271,139
3 Claims. (Cl. 204—196)

The present invention relates to a cathodic protection and anti-marine fouling electrode system, and more particularly to an electrode assembly having the dual function of providing cathodic protection to a structure immersed in sea water and simultaneously providing galvanic decomposition products toxic to marine fouling organisms.

Experience on ships has so far shown that cathodic protection appears to have no appreciable discouraging action on marine fouling and that with current densities normally employed in cathodic protection there is no noticeable effect on marine fouling. Therefore, cathodically protected ship hulls were advantageously painted with anti-fouling paints containing, for example, copper in the form of cuprous oxide as the toxic anti-fouling material to provide for the dual purposes of cathodic protection and anti-fouling.

In accordance with this invention, it has been discovered that either anti-fouling or both anti-fouling and cathodic protection can be accomplished by a cathodic protection system comprising in combination a particular electrode structure wherein one electrode element is anodic to another electrode element and spaced therefrom or insulated therefrom in substantially closely spaced relationship, both elements being anodic to and insulatingly mounted on a metallic structure being cathodically protected, and means for maintaining at least periodically an anode-cathode relationship of the electrode elements.

It is an object of the invention to provide an electrode assembly in a cathodic protection system whereby a structure immersed in sea water is both cathodically protected and resistant to marine fouling organisms.

Other objects and advantages of the invention will become apparent from the description hereinafter following and the drawings forming a part hereof, in which:

FIGURE 1 is an isometric view of a composite electrode according to the invention, FIGURE 2 is an isometric view of a modified form of composite electrode, FIGURE 3 is a partly cross-sectional and partly elevational view of an electrode assembly according to the invention, FIGURE 4 is a partly cross-sectional and partly elevational view of another cooperating electrode assembly, FIGURE 5 is a partly elevational, partly cross-sectional, and partly diagrammatic view of the electrode system, FIGURE 6 illustrates a diagrammatic view of an electrical circuit for energizing the electrode system of the invention, FIGURE 7 illustrates a modified circuit for anti-fouling, and FIGURE 8 illustrates a modified circuit for both anti-fouling and cathodic protection.

Regarding FIGURES 1 and 2, the composite electrode structure of the invention comprises a first elongated metallic electrode 1 and a second elongated metallic electrode 2 preferably parallel and co-extensive with the first electrode and insulatingly spaced therefrom in substantially closely spaced relationship, for example, by means of a polyester dielectric or insulation member 3 positioned therebetween and bonding the electrodes together to form a composite electrode. The electrodes are both composed, for example, of tantalum or titanium and both being advantageously externally coated with a noble metal 4 such as platinum, as illustrated in FIGURE 2.

The composite electrodes, according to FIGURES 1 or 1, are mounted on and longitudinally of a ship's hull and spaced therefrom at locations adjacent the ship's keel by cooperating first and second mounting means illustrated by FIGURES 3 and 4.

FIGURE 3 illustrates a first mounting means in the form of a disc-like member 5 of dielectric plastic material having a convex outer surface 6 and a flat inner surface 7 with an integral dielectric nipple 5' extending axially outwardly of disc from its concave surface.

The disc and nipple structure are molded into the configuration illustrated. Prior to the molding operation, a circular centrally apertured plate 8 is coaxially welded or brazed onto an end of a metallic cylindrical block 9, e.g. by brazing fillet 10. A conductor rod 11 with its end inserted into the plate aperture is welded or brazed to the plate, e.g. by fillets 12. An insulation sleeve 13 having a flared end 14 is fitted onto the rod 11 with the flared end mating the surface of plate 8. A second metal sleeve 15 having a threaded outer surface 16 and a flared end 17 is fitted over the insulation sleeve 13 with the flared end 17 mating the flare end surface 14' of the sleeve 13. Thereafter, the sleeves, plate and block are embeddedly molded into the disc 5 with the block 9 extending only partly into and embedded by the nipple 5' thereby providing a nipple terminal portion 5'' of dielectric material. Having completed the molding operation, a bore 18 is formed into the end 5'' coaxially of the cylindrical nipple and extending coaxially into the block 9. The bore portion 18 extending into the block is at least partly internally threaded as at 19. A lead connector 20 is mounted at the free end of rod 11. Preferably, the terminal of end 5'' is provided with a transverse concave groove or seat S to accommodate a cylindrical electrode.

FIGURE 4 illustrates a second mounting means in the form of a disc-like member 21 of dielectric plastic material having a convex outer surface 22 and a flat inner surface 23 with an integral dielectric nipple 21' extending axially outwardly of the disc from its concave surface.

The disc and nipple structure are molded into the configuration illustrated. Prior to the molding operation, a circular centrally apertured plate 24 is coaxially welded or brazed onto an end of a metallic cylindrical block 25, e.g by brazing fillet 26. A conductor rod 27 with its end inserted in the plate aperture is welded or brazed to the plate, e.g. by fillets 28. An insulation sleeve 29 having a flared end mating the surface of plate 24. A second metal sleeve 31 having a threaded outer surface 31' and a flared end 32 is fitted over the insulation sleeve 29 with the flared end 32 mating the flared end surface 24' of sleeve 29. Thereafter the sleeves, plate and block are embeddedly molded in disc 21 with the block 25 extending into and substantially coextensively of the nipple 21' to provide an electrically contacting end portion 25' at the end of and encompassed by the terminal end portion of nipple 21'. Having completed the molding operation, a bore 32 is formed into the exposed end of and coaxial with the block 25. The bore is at least partly internally threaded as at 33. A lead connector 34 is mounted at the free end of rod 27. Preferably, the terminal end of nipple 21' is provided with a transverse groove or seat similar to seat S of the first mounting means of FIGURE 3.

Having provided the first and second mounting means of FIGURES 3 and 4, a plurality of the mounting means, preferably but not necessarily in alternate order of a first and a second mounting means laterally spaced from each other, are mounted on and longitudinally of a ship's hull at locations adjacent the ship's keel.

FIGURE 5 illustrates the manner in which the mounting means are mounted relative to the ship's hull. Both the first and second mounting means are identically secured to the ship's hull with identical electrical connection means associated therewith. Common reference numerals denote identical structures. The disc-like members, e.g. member 21, are mounted against hull 35 with an insulation layer 36 therebetween. The threaded sleeve 31 passes through the insulation layer and through an aperture 37 through the ship's hull and extends into the hull. A centrally apertured insulation disc 38 with its aperture aligned with the hull aperture 37 is mounted on the inner surface of the hull 35. The threaded sleeve 31 also passes through the aperture of disc 38. An apertured reinforcing or backing disc 39 for the insulation disc is passed over the sleeve 31 against the insulator 38. An apertured spacer ring 40 is mounted on the sleeve 31 in abutment with the backing disc 39. An elongated nut 41 internally threaded as at 42 and containing internally thereof an insulation tube 43 is passed over a free end of lead-in conductor rod 44 prior to the connection of the lead-in conductor to lead connector 34. Thereafter the end of lead-in conductor 44 is connected to lead connector 34, for example by a bolt connector means 45. Having connected the lead-in conductor to the conductive rod 27, the elongated nut 41 is mounted on sleeve 31 threadedly engaged with threads 31' until the nut 41 is pressed against spacer ring 40. An externally threaded cap nut 46 is threadedly mounted into the open end 47 of nut 41 with the portion thereof extending outwardly of nut 41 in abutment with a sealing nut 48.

Having mounted the first and second mounting means 5 and 21, the free ends 49 and 49' of each of the composite electrodes are transversely grooved normal to the insulation layer 3 to provide concave seats 50 and 50' and an insulation tube 51 is mounted in the seats 50 and 50' as more particularly illustrated by FIGURES 3 and 4. The ends 49 and 49' of each composite electrode are positioned adjacent each other with the tube 51 therebetween and nested in the seats 50 and 50' of each end 49 and 49'. The two composite electrodes are positioned for mounting onto the mounting means, e.g. the mounting means of FIGURE 3 with the insulation tube 51 in communicating alignment with the bore 18. A metal bolt having a head 52 and a shank 53, threaded as at 54, is provided with an apertured metal conductive clamp member 55 having an arcuate surface 56 adapted to conform in mating contact with the cylindrical composite electrode. The clamp 55 is mounted on the shank 53 and in abutment against the head 52 with the concave arcuate surface 56 facing the free end of the shank. The threaded shank is then passed through tube 51 into the bore 18 and threadedly engaged with threads 19 of block 9 thereby clamping the ends of the two electrodes between metal clamp 55 and the terminal end of nipple 5' with the dielectric end portion 5" contacting the electrode component 1. In this mounting by means of the first mounting member of FIGURE 3, a source of potential connected to the lead connector 20 energizes the electrode component 2 through block 9 and shank 53 and clamp 55 and the other electrode component 1 is insulated therefrom by the layer 3, the end 5" and tube 51.

In mounting by means of the second mounting means of FIGURE 4, an identical mounting bolt is employed but the clamp 55 of FIGURE 3 is substituted by an identically shaped and identically mounted insulation clamp 57. The ends of two concave electrodes, one electrode being a common electrode secured to both the first and second mounting means, as illustrated by FIGURE 5, are positioned as described in the mounting of the first electrode. In this case, the electrode element 1 engages the exposed end 25' of conductive block 25 and the ends of the electrodes are clamped as described with respect to FIGURE 3. As a result of the mounting by means of the second mounting means a source of potential connected to the lead terminal 34 of FIGURE 4 energizes the electrode component 1 through block 25 and shank 53 since the other electrode component 2 is insulated therefrom by the layer 3, the tube 51 and the insulation clamp member 57.

It is, therefore, apparent that the electrode components 1 and 2 may be energized by potentials of different values. For example, electrode component 1 may be energized by a 3 volt potential and electrode component 2 may be energized by a 5 volt potential. When so energized in an electrolyte, one of the electrode components is anodic to the other, i.e. the electrode with the higher applied potential is an anode while the other is a cathode and the composite electrode acts together with the electrolyte as an electrolytic cell. While the above voltages impressed on the electrode components are merely by way of example, sufficient voltage is applied to both electrode components to provide a voltage differential high enough to provide a flow of electrolytic decomposition products toxic to marine organisms, for example, the decomposition products sodium hypochlorite, chlorine and oxygen. Since the composite electrodes are mounted at a lower portion of the hull, the decomposition products will rise upwardly along the walls of the hull in contact with surfaces subject to marine fouling.

In accordance with the invention, an electrical system such as illustrated by FIGURE 6 is employed. The electrical system incorporates a cathodic protection system in combination with a marine anti-fouling system. The cathodic protection system includes a sensing circuit for detecting changes in cathodic protection conditions and comprising a reference element or sensing electrode 58, such as a silver-silver chloride half-cell, cooperating when submerged in sea water with the surface of a ship hull 35 to be cathodically protected as the other electrode. The voltage generated by this reference cell is about 0.85 volt when proper cathodic protection of a steel hull is taking place. When the voltage developed by this sensing cell increases or decreases significantly from the 0.85 volt value, the protective current supplied to the cathodic protection anode or anodes is increased or decreased until the desired optimum condition represented by the voltage level of 0.85 volt is achieved. Consequently, direct current supplied to the anodes for cathodic protection of the hull, as hereinafter more particularly described, is regulated in accordance with the differential signal voltage supplied by the reference half-cell. In order to reduce the consumption of the reference cell material, e.g. silver chloride, an additional source of voltage 59 is connected into the sensing circuit in opposition to the voltage developed by the reference half-cell. The resultant differential voltage is of small value. However, by using a highly sensitive D.C. magnetic amplifier 60 responsive to the differential signals, the magnetic amplifier is capable of applying such differential small signals to a saturable reactor 61, which is responsive to the amplifier output, to control the reactor which reactor in turn automatically adjusts and determines the current drawn from the power supply generally designated as 62. The adjusted current is then rectified through full wave rectifier 63 and applied to the hull 35 and to the anode 1 or anodes 1 and 2 as hereinafter more particularly described.

The power supply 62 comprises a transformer having a primary input winding 64 and split secondary output windings 65 and 66, the output windings being a first stage winding 65 and a second stage winding 66. The reference cell 58 is connected to amplifier 60 by amplifier input conductor 67. The source of opposing or bucking voltage 59 in the sensing circuit has its negative pole grounded directly to the hull 35 and its positive pole connected to one end of potentiometer 68 with the other end of the potentiometer grounded to the hull. A contact arm 69 of the potentiometer is set to deliver a predetermined voltage value from source 59 in opposition to reference cell output. This predetermined voltage output from potentiometer 68 is connected to the magnetic amplifier through conductor 70 and in opposition to the voltage applied from the reference cell to the amplifier. The differential output current of the amplifier is connected to saturable reactor 61 through leads 71 and 72. Transformer secondary output leads 73 and 74 are connected across the first stage winding 65 and to input terminals 75 and 76 of full wave rectifier 63, with the saturable reactor 61 connected into one of the leads 73 or 74, e.g. lead 73 as shown. Output terminal 77 of rectifier 63 is connected to ground at the hull 35 by conductor 78 and the other rectifier output terminal 79 is connected to anode 1. At this stage, the hull 35 is equipped with an operable adequate cathodic protection system.

In order to provide for protection against marine antifouling as well as cathodic protection, the second stage winding 66 and the first stage winding 65 are employed. Secondary leads 80 and 81 are connected across the second stage winding and to input terminals 82 and 83 of a second full-wave rectifier 84. A second saturable reactor 85 is connected into one of the leads 80 and 81. The power drawn from the second stage winding 66 is determined by saturable reactor 85 which is regulated by another source of D.C. voltage 86 connected to the reactor 85 by leads 87 and 88. A variable resistor 89 is connected into lead 88 whereby the D.C. control voltage to reactor 85 is controlled, e.g. manually. Output terminal 90 of full-wave rectifier 84 is connected to conductor 79 which is connected to anode 1. Output terminal 90 of full-wave rectifier 84 is connected to anode 2 by means of conductor 92 with a switch 93 connected into the conductor 92. The switch comprises a movable arm 94 adapted to open or close the circuit between conductor 79 and anode 2 by cooperation with contact 95 in conductor 92. In addition, the arm 94 is engageable with another contact 96 connected to conductor 79 by conductor 97 so that when arm 94 is engaged with contact 95 it is disengaged from contact 97 and vice versa.

When a ship is underway anti-fouling protection is less urgent and under such condition the switch arm 94 is engaged with contact 96 whereby the anode 2 is connected in parallel with anode 1 and disengaged from the second stage winding circuit. In such case both anodes 1 and 2 are substantially equally energized by the first stage winding 65 to provide for cathodic protection of the hull 35. When the ship is at dock and anti-fouling protection is desirable, the switch arm 94 is engaged with contact 95. In this condition rectified current of higher or lower value than that provided by the first stage winding 65 is applied to anode 2 thereby providing a voltage differential between anode 1 and anode 2. With such applied voltage differential, either anode 1 or anode 2 is anodic and the other cathodic relative to each thereby forming an electric cell. However, both electrodes 1 and 2 are anodic to the ship hull 35. Consequently, the electrodes 1 and 2 provide for cathodic protection of the hull 35 and at the same time provide for the electrolytic decomposition of the sea water to create decomposition products toxic to marine organisms. In such case the combination of electrodes 1 and 2, the hull and the associated circuitry cooperate to provide both for cathodic protection and marine anti-fouling.

While the invention described above is directed specifically to a composite electrode employed in a system applicable both for cathodic protection and anti-fouling, various modifications are contemplated for providing either anti-fouling protection alone by means of a pair of spaced electrodes, or both anti-fouling and cathodic protection by means of a third separate anode in addition to the pair of electrodes. In lieu of the composite electrodes illustrated in FIGURES 1 through 5, a pair of electrodes spaced from each other may be employed without insulation means therebetween. FIGURES 7 and 8 illustrated a pair of such spaced electrodes 98 and 99.

FIGURE 7 illustrates a circuit for anti-fouling protection comprising a source of potential 100 having its positive pole connected to one of a pair of spaced electrodes 98 and 99 and its negative pole connected to the other. The pair of spaced electrodes are also spaced from metal base 101 to be protected, e.g. the hull of a ship. Electrodes 98 and 99 are essentially spaced from each other so as to provide a resistance $R_1$ therebetween which is less than the substantially equal resistances $R_2$ and $R_3$ between the respective electrodes 98 and 99 and the metal base 101. The resistances $R_1$, $R_2$ and $R_3$ are merely schematic representations. For example, when the electrodes are immersed in an electrolyte, the relative resistances can be obtained merely by providing a greater spacing between the electrodes and the base 101 than the spacing between the electrodes themselves, since such spacing in the electrolyte will provide the requisite relative resistances. Having provided the relative resistances described above, currents will flow not only between the electrodes, but also from the positive electrode to the base and from the base toward the negative electrode as illustrated by the arrows. In such case, currents leaving the base will have some corrosion activity. To counterbalance such corrosion activity, a variable resistance $R_4$ is connected between the negative electrode 99 and the base 101 to eliminate or reduce the flow of current to the base.

FIGURE 8 represents a modification of FIGURE 7 in that the resistance $R_4$ is substituted by a cathodic protection circuit including a source of potential 103 having its positive pole connected to an anode 104 spaced from the base 101 and its negative pole connected to the base 101, whereby when energized a greater flow of protective current from the anode 104 as indicated by the arrow counterbalances any flow of current from the base and effectively cathodically protects the base. In this modification the base is protected both against fouling as well as corrosion.

Various modifications of the invention are contemplated within the scope of the appended claims.

What is claimed is:

1. A cathodic protection and anti-marine fouling system comprising a metal base in contact with an electrolyte, a composite electrode having first and second electrode components closely spaced from each other and bonded to each other with an insulation means therebetween insulating the electrode components from each other, said composite electrode being spaced from said base and in contact with said electrolyte, first electrical conductor means connected to the first electrode component, second electrical conductor means connected to the second electrode component, a first electrical input circuit connected to the first electrical conductor means, a second electrical input circuit connected to the second electrical conductor means, external source means for providing one of said circuits with a higher potential than the other thereby providing a differential potential between the first and second electrode components, and means for electrically connecting said metal base to said electrode components, said metal base being cathodic to both said electrode components.

2. A cathodic protection and anti-marine fouling system according to claim 1, wherein said means for providing one of said circuits wth a higher potential than the other comprises a transformer having a primary winding and a pair of split secondary windings, one of the secondary windings connected to one of said first and second electrode components, and the other secondary winding connected to the other electrode component.

3. A cathodic protection and anti-marine fouling system according to claim 1 wherein the electrode components are composed of tantalum or titanium metal externally coated with a noble metal layer.

References Cited by the Examiner

UNITED STATES PATENTS

| | | | |
|---|---|---|---|
| 474,914 | 6/1892 | Bernard | 204—196 |
| 1,953,653 | 4/1934 | Lima | 204—275 |
| 2,215,213 | 9/1940 | Ellis | 204—280 |
| 2,491,225 | 12/1949 | Stearns | 204—147 |
| 2,758,267 | 8/1956 | Short | 204—197 |
| 2,762,767 | 9/1956 | Mosher et al. | 204—147 |
| 2,784,156 | 3/1957 | Maurin | 204—147 |
| 2,903,405 | 9/1959 | Sabins | 204—196 |
| 2,986,512 | 5/1961 | Sabins | 204—196 |
| 2,994,658 | 8/1961 | Preiser et al. | 204—196 |
| 3,055,813 | 9/1962 | Schaschl et al. | 204—147 |
| 3,067,123 | 12/1962 | Huber | 204—228 |

FOREIGN PATENTS

| | | |
|---|---|---|
| 1,149,947 | 7/1957 | France. |
| 1,112,048 | 8/1961 | Germany. |

JOHN H. MACK, *Primary Examiner.*

T. TUNG, *Assistant Examiner.*